United States Patent [19]

Ling et al.

[11] Patent Number: 4,638,401
[45] Date of Patent: Jan. 20, 1987

[54] CERAMIC COMPOSITIONS AND DEVICES

[75] Inventors: Hung C. Ling, West Windsor Township, Mercer County; Man F. Yan, Berkeley Heights, both of N.J.

[73] Assignees: AT&T Technologies, Inc., Berkeley Heights; Bell Telephone Laboratories, Inc., Murray Hill, both of N.J.

[21] Appl. No.: 817,805

[22] Filed: Jan. 10, 1986

Related U.S. Application Data

[63] Continuation-in-part of Ser. No. 666,200, Oct. 29, 1984, abandoned.

[51] Int. Cl.[4] .................. H01G 4/10; C04B 33/34; C04B 35/46
[52] U.S. Cl. ....................... 361/321; 156/89; 264/61; 501/137
[58] Field of Search ............... 156/89; 264/56, 61, 264/65; 501/134–138; 361/320, 321

[56] References Cited

U.S. PATENT DOCUMENTS

| | | | |
|---|---|---|---|
| 3,529,978 | 9/1970 | Taylor et al. | 501/138 |
| 3,600,652 | 8/1971 | Riley | 361/321 |
| 3,933,668 | 1/1976 | Takahashi et al. | 252/63.5 |
| 4,078,938 | 3/1978 | Yonezawa et al. | 156/89 X |
| 4,115,493 | 9/1978 | Sakabe et al. | 264/65 X |
| 4,459,364 | 7/1984 | McSweeney et al. | 501/137 |
| 4,490,318 | 12/1984 | Masuyama et al. | 264/61 |

FOREIGN PATENT DOCUMENTS

| | | |
|---|---|---|
| 0048871 | 4/1982 | European Pat. Off. |
| 63866 | 5/1981 | Japan |

*Primary Examiner*—Donald A. Griffin
*Attorney, Agent, or Firm*—J. F. Spivak

[57] ABSTRACT

A novel low sintering temperature ceramic composition particularly suitable for multilayer ceramic capacitors is disclosed. The composition comprises a mixture represented by the formula $$(1-x)Bi_2(ZnNb_{2(1+d)})yO_{3+6y+5dy}(x)Bi_3(Ni_2Nb)O_9$$

where $0 < x < 1$, $0.6 \leq y \leq 1.1$ and $-0.05 \leq d \leq 0.05$.

16 Claims, 3 Drawing Figures

CERAMIC COMPOSITIONS AND DEVICES

This is a continuation-in-part of application Ser. No. 666,200, filed Oct. 29, 1984, now abandoned.

TECHNICAL FIELD

This invention relates to a ceramic dielectric composition having a low dissipation factor and a small temperature coefficient and to ceramic capacitors made therefrom.

BACKGROUND OF THE INVENTION

The electronics field, and particularly the electronic component field, is constantly seeking to improve devices such as capacitors employed in electronic circuits.

There is a particular need for dielectric materials for use in capacitors which exhibit low dissipation factors (or high Q values) at the operating frequencies and have a low temperature coefficient which preferably can be altered depending upon composition to give a negative, positive or zero temperature coefficient (NPO materials). It is preferred that these materials have as high a dielectric constant as possible in a temperature range of from $-55°$ C. to $125°$ C. However, as Q increases, generally, the dielectric constant decreases such that the attainment of high dielectric constants and high Q has been mutually unattainable. Typical presently available ceramic compositions which have Qs up to about 1,000 at 1 MHz exhibit dielectric constants of only about 20 and temperature coefficients of $[\pm 0$ to $1000] \times 10^{-6}/°C$.

It is therefore desirable to develop a dielectric material having values of Q of at least 1000 at 1 MHz while attaining dielectric constants of at least 100 at typical operating temperatures.

Of further interest for the commercial manufacture of such dielectric materials, is that the material be sinterable at temperatures of preferably less than $1,000°$ C. This reduction in sintering temperature not only saves cost in the sintering operation, but also allows less expensive electrodes to be applied to the ceramic material, particularly when employed in a multilayer ceramic capacitor having electrodes between layers which are incorporated prior to sintering.

Dielectric materials based upon strontium titanate and having minor amounts of other oxides such as niobium oxide or tantalum oxide, germanium oxide or zinc oxide and a smaller amount of either bismuth oxide or a mixture of bismuth oxide and other oxides diffused therein are described in U.S. Pat. No. 3,933,668. Also, a dielectric material based upon lead niobate together with oxides of a metal from the group consisting of Bi, Zn, Cd, Pb, Sn, Si, Sb, As, Ge and a combination thereof as well as a metal of the group consisting of Mg, Sr, Ba, Li, Na, K, Rb and Cs is taught in U.S. Pat. No. 3,600,652. Further, Europatent No. 0048871 teaches a ceramic composition consisting of $Bi_6Zn_4Sb_2O_{18}$. None of the above compositions exhibit the combined properties being sought.

SUMMARY OF THE INVENTION

The present invention provides a low sintering temperature dielectric ceramic material with a small temperature coefficient $\pm(10^{-4}-10^{-6}/°C.)$, a high Q value (1,000 to 3,000), a low sintering temperature ($880°$ to $1050°$ C.) and a high Curie temperature ($>500°$ C.). The novel compositions comprise sintered mixtures of $(1-x)Bi_2(ZnNb_{2(1+d)})_yO_{3+6y+5dy}\cdot(x)Bi_3(Ni_2Nb)O_9$ where $0<x<1$, $0.6 \leq y \leq 1.1$ and $-0.05 \leq d \leq 0.05$, x representing a weight fraction.

Also included in the invention are capacitors employing the novel ceramic composition.

DETAILED DESCRIPTION

We have discovered that certain compositions employing mixtures based upon $Bi_2(ZnNb_2)O_9$ type compounds and $Bi_3(Ni_2Nb)O_9$ can be prepared which have a combination of favorable properties. For example, novel compositions can be prepared which have a dielectric constant of from 65 to 165, a low temperature of coefficient of $\leq 20 \times 10^{-6}/°C.$, a high Q value of 2,000 to 3,000 and a low sintering temperature of $880°$ to $920°$ C. This latter low sintering temperature allows the use of silver electrodes. However, some less preferred compositions may require sintering temperatures of up to $1050°$ C. Generally, the novel compositions may be prepared by conventional powder processing techniques. Typical preferred compositions comprise about 20-30 weight percent of $Bi_3Ni_2NbO_9$ and about 70-80 weight percent of $Bi_2(ZnNb_{2(1+d)y})O_{3+6y+5dy}$ where $0.6 \leq y \leq 1.1$ and $-0.05 \leq d \leq 0.05$. However, variations of $Bi_3Ni_2NbO_9$ of from $<0$ to 100 weight percent are suitable, the balance being the bismuth zinc niobate as aforementioned. Typically, the required quantities of the oxide powders are mixed in deionized water using a $ZrO_2$ milling media in polyethylene containers. The mixed powders are dried and the dried powder calcined in air at about $800°$ C. for several hours in a covered platinum or silica crucible. Prior to use or sintering, the calcined powder is granulated. For the purposes of testing the materials the granulated calcined powder is pressed at about 10,000 psi into discs of about 0.1" thick and 0.25" diameter. The pressed discs are then sintered in oxygen at between $880°$ to $1050°$ C. depending upon the composition. The sintered discs are then ultrasonically soldered with indium electrodes for testing purposes. The dielectric properties and other properties of these sintered materials were then measured by standard techniques. The dielectric properties were measured at frequencies ranging from 10 KHz to 3 MHz and at temperatures ranging from $-40°$ C. to $125°$ C.

Figure 1:
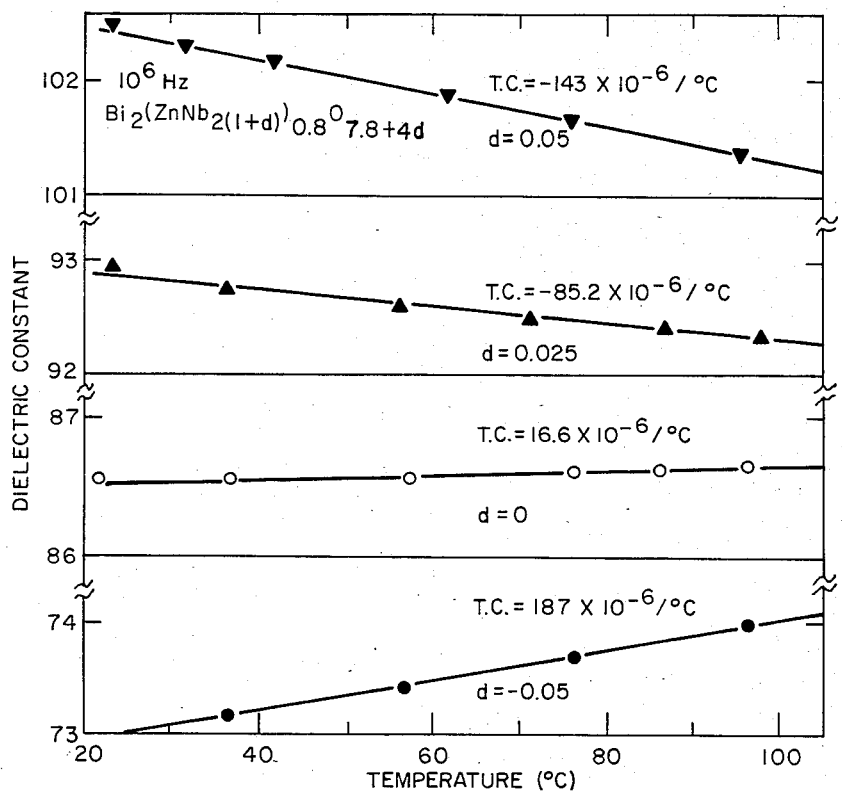
FIG. 1 is a graphical representation of the dielectric constants measured at 1 MHz plotted against temperature for novel compositions with different niobium contents.
Figure 2:
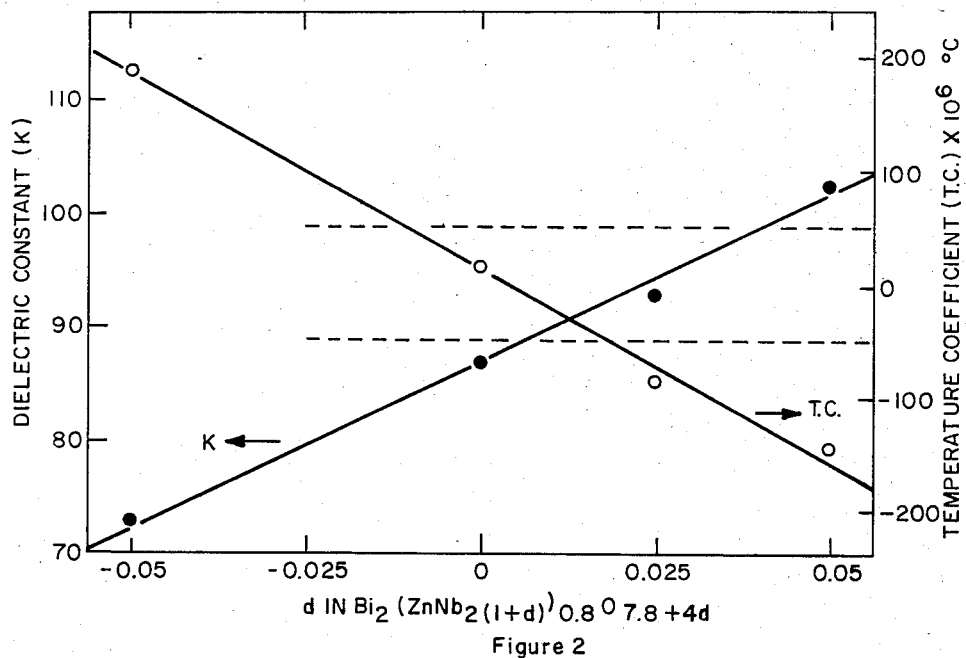
FIG. 2 is a graph depicting dielectric constants and temperature coefficients versus the niobium content of the novel compositions.

FIG. 1 shows the dielectric constants of the ceramic discs with different niobium contents sintered at $920°$ C. for four hours in oxygen. FIG. 2 shows the dielectric constants and temperature coefficients as a function of the niobium content in the novel compositions. It can be seen from the figures that both the magnitude of the dielectric constant and that the temperature coefficient vary with the niobium content. In the range of compositions as set forth, wherein d is from $-0.05$ to 0.05, the dielectric constant ranges from 70 to 105 and the temperature coefficients range from $-120\times10^{-6}/°C$. to $+180\times10^{-6}/°C$. It can be seen from FIG. 2 that the temperature coefficient which was measured between $-40°$ C. and $100°$ C. changes from a positive value to a negative value as the niobium content increases. Consequently, one can adjust the composition to obtain a zero or almost zero temperature coefficient. For example, from the data one can seen that a ceramic composition with a dielectric constant of 88 and a temperature coefficient of less than $1\times10^{-6}/°C$. can be obtained. Such a ceramic would have the following composiiton:

26.5 weight percent $Bi_3(Ni_2Nb)O_9 \cdot (73.5$ weight percent$)Bi_2(ZnNb_{2(1+d)})_{0.8}O_{7.8+4d}$ where $d=0.0125$ A range of compositions with a temperature coefficient of less than $50\times10^{-6}/°C$. is delineated within the dotted lines shown in FIG. 2. The Q values of these compositions were measured to be between 2,000 and 3,000 in the 100 KHz to 3 MHz frequency range. Table I shown below gives a comparison between the new low firing compositions of the present invention and conventional (Ca, Mg, $ZnTiO_3$) type ceramics. It can be seen from the Table that with respect to the dielectric constant, dielectric loss, Q value and temperature coefficient, the new compositions are better than or equal to the conventional compositions. More importantly, the new compositions have a significantly lower sintering temperature than the conventional compositions. This permits the use of less expensive silver electrodes when making certain types of ceramic capacitors, e.g., multilayer ceramics where the electrodes are present on the ceramic material during the sintering operation.

TABLE I

| | TYPICAL NOVEL COMPOSITIONS | CONVENTIONAL (Ca, Mg, Zn) TiO$_3$ Type Compositions |
|---|---|---|
| K | 80–110 | 20–60 |
| Q | 2000–3000 | 2000–3000 |
| T.C ($10^{-6}/°C$.) | ±50 | ±50 |
| Sintering Temp. °C. | 880–920° | 1100–1400 |
| Electrode | Ag | high Pd |

Table II shows the sintering temperature and room temperature properties of the novel formulation for different values of d and y and a fixed value of x of 0.265. The loss factor is given both in terms of tan δ and Q where $Q=1/\tan \delta$.

TABLE II

| y | d | Sintering Temp. (°C.) | Dielectric Constant (K) (1 MHz) | tan δ (1 MHz) | Q | Resistivity (ohm-cm) | Density (g/cc) | Temp. Coeff. × $10^{-6}/°C$. |
|---|---|---|---|---|---|---|---|---|
| 0.6 | 0 | 920 | 73 | 0.0008 | (1,250) | $2.2 \times 10^{15}$ | 7.25 | 280 |
| 0.75 | 0 | 920 | 75 | 0.0010 | (1,000) | $9.9 \times 10^{14}$ | 7.21 | 228 |
| 0.8 | −0.05 | 920 | 74 | 0.0005 | (2,000) | $2 \times 10^{15}$ | 7.24 | 178 |
| | 0 | 920 | 87 | 0.0003 | (3,300) | $2 \times 10^{15}$ | 7.21 | 29 |
| | 0.025 | 920 | 93 | 0.0004 | (2,500) | $1.1 \times 10^{15}$ | 7.16 | −54 |
| | 0.05 | 920 | 102 | 0.0004 | (2,500) | $1.1 \times 10^{15}$ | 7.16 | −121 |
| 0.9 | −0.05 | 960 | 97 | 0.0007 | (1,400) | $1 \times 10^{14}$ | 6.49 | −128 |
| | 0 | 960 | 112 | 0.0004 | (2,500) | $5 \times 10^{14}$ | 6.58 | −285 |
| | 0.025 | 960 | 123 | 0.0008 | (1,250) | $1 \times 10^{14}$ | 6.59 | −285 |
| | 0.05 | 960 | 143 | 0.0010 | (1,000) | $1 \times 10^{14}$ | 6.55 | −414 |
| 1.0 | −0.05 | 960 | 150 | 0.0000 | (>10,000) | $5 \times 10^{14}$ | 6.38 | −457 |
| | 0 | 960 | 150 | 0.0004 | (2,500) | $6 \times 10^{14}$ | 6.61 | −500 |
| | 0.025 | 1000 | 165 | 0.0000 | (>10,000) | $3 \times 10^{14}$ | 6.16 | −579 |
| | 0.05 | 1025 | 165 | 0.0000 | (>10,000) | $3 \times 10^{14}$ | 6.37 | −546 |
| 1.1 | −0.05 | 1025 | 150 | 0.0008 | (1,250) | $7.7 \times 10^{13}$ | 6.19 | −554 |
| | 0 | 1025 | 158 | 0.0000 | (>10,000) | $2.2 \times 10^{14}$ | 6.49 | −554 |
| | 0.025 | 1050 | 142 | 0.0007 | (1,400) | $3.5 \times 10^{12}$ | 6.21 | −471 |
| | 0.05 | 1050 | 151 | 0.0001 | (10,000) | $1 \times 10^{15}$ | 6.37 | −536 |

As can be seen from the table, for compositions with $x=0.265$, sintering temperatures go up from 920° C. to 1050° C. as y is increased from 0.8 to 1.1. In order to maintain sintering temperatures of less than 1000° C. such that silver electrodes can be employed, y should not exceed 1.0. Further, the general tendency for the dielectric constant to increase with increasing values of d as d is varied from $-0.05$ to $+0.05$ at values of y from 0.8 to 1.0 is apparent. A further observation that can be made from the table is the higher resistivities achieved at the lower values of y. Hence, if one desires a high resistivity low sintering composition and can accept dielectric constants of from 74 to 102, a formulation wherein $y=0.8$ is most suitable. This composition will also provide low NPO type temperature coefficients. However, if the prime objective was to attain higher dielectric constants with a high Q then a formulation wherein $y=1.0$ to 1.1 is most suitable.

Table III shows the sintering temperature and room temperature properties for formulations wherein $d=0$ and $y=0.8$ as a function of x. The table gives values of loss in terms of both tan δ and Q.

TABLE III

| x | Sintering Temp. (°C.) | Dielectric Constant (K) (1 MHz) | tan δ (1 MHz) | (Q) | Resistivity (ohm-cm) | Density (g/cc) | Temp. Coeff. × $10^{-6}/°C$. |
|---|---|---|---|---|---|---|---|
| 0 | 1050 | 126 | 0.008 | (125) | $2.4 \times 10^{11}$ | 6.40 | 128 |
| 0.09 | 960 | 110 | 0.0006 | (1,600) | $1.9 \times 10^{14}$ | 6.73 | −150 |
| 0.265 | 920 | 87 | 0.0003 | (3,300) | $2.0 \times 10^{15}$ | 7.21 | 29 |
| 0.50 | 920 | 67 | 0.0008 | (1,250) | $1.5 \times 10^{14}$ | 6.95 | 125 |
| 0.67 | 960 | 90 | 0.0024 | (400) | $4.8 \times 10^{13}$ | 9.46 | −150 |

TABLE III-continued

| x | Sintering Temp. (°C.) | Dielectric Constant (K) (1 MHz) | tan δ (1 MHz) | (Q) | Resistivity (ohm-cm) | Density (g/cc) | Temp. Coeff. $\times 10^{-6}/°C.$ |
| --- | --- | --- | --- | --- | --- | --- | --- |
| 1.00 | 1000 | 71 | 0.005 | (200) | $2.4 \times 10^{12}$ | 6.96 | 275 |

As can be seen from this table, compositions wherein x=0 or x=1.00 afford very low values of Q and are generally incompatible with attaining values of Q over 1,000 even with a variation of y and d. Also, the compositions with x=0 or x=100 exhibit the lowest resistivity. Generally, a higher resistivity is preferred in capacitor and other device fabrication to minimize leakage.

Figure 3:
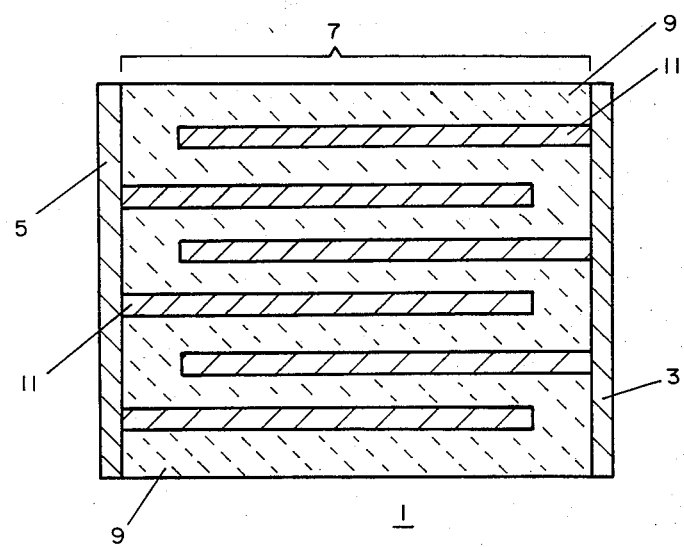
FIG. 3 is a figure of a multilayer ceramic capacitor employing the novel compositions of this invention.

FIG. 3 shows a typical multi-layer sintered capacitor 1. This capacitor 1 comprises electrodes 3 and 5 which contact opposite sides of the capacitor body 7. The capacitor body 7 is comprised of a plurality of ceramic layers 9 which are interleaved with metal conductor layers 11. The metal layers 11 are alternately connected to the electrodes 3 and 5, respectively. The layers 9 consist essentially of the novel ceramic compositions set forth herein. The method for making such a device is well known in the art and need not be set forth herein. When utilizing the low sintering temperatures suitable with many of the novel compositions, silver is a preferred electrode material.

What is claimed is:

1. A capacitor comprising at least one pair of spaced electrodes and a ceramic composition therebetween said composition comprising a sintered mixture as represented by the formula $$(1-x)Bi_2(ZnNb_{2(1+d)})_yO_{3+6y+5dy} \cdot (x)Bi_3(Ni_2Nb)O_9$$

where $0 < x < 1$, $0.6 \leq y \leq 1.1$ and $-0.05 \leq d \leq 0.05$, x representing a weight fraction.

2. The capacitor set forth in claim 1, wherein x is from 0.2 to 0.3.

3. The capacitor recited in claim 2, wherein y is 0.8.

4. The capacitor recited in claim 3, wherein d is between −0.06 and 0.025.

5. The capacitor recited in claim 3, wherein d is about 0.0125.

6. The capacitor recited in claim 3, having silver electrodes.

7. The capacitor recited in claim 1, having silver electrodes.

8. The capacitor recited in claim 1, wherein x is about 0.265 and y is about 0.8.

9. The capacitor described in claim 1 having a dielectric constant (K) greater than 65 and a loss factor (Q) greater than 1000.

10. A multilayer ceramic capacitor comprising a sintered ceramic body, consisting essentially of a composition represented by the formula $$(1-x)Bi_2(ZnNb_{2(1+d)})_yO_{3+6y+5dy} \cdot (x)Bi_3(Ni_2Nb)O_9$$

where $0.2 \leq x \leq 0.3$, $0.6 \leq y \leq 1.0$ and $-0.05 \leq d \leq 0.05$ and a plurality of spaced silver conductor layers interleaved within said body, every other conductive layer connected to and terminating at one of two electrode contacts which are disposed on opposite faces of the ceramic body.

11. A ceramic composition consisting essentially of a sintered mixture represented by the formula $$(1-x)Bi_2(ZnNb_{2(1+d)})_yO_{3+6y+5dy} \cdot (x)Bi_3(Ni_2Nb)O_9$$

where $0 < x < 1$, $0.6 \leq y \leq 1.1$ and $-0.05 \leq d \leq 0.05$.

12. The composition recited in claim 11, wherein x is from 0.2 to 0.3.

13. The composition recited in claim 12, wherein y is 0.8.

14. The composition recited in claim 13, wherein d is between 0.06 and 0.025.

15. The composition recited in claim 13, wherein d is about 0.0125.

16. The composition recited in claim 11, wherein x is about 0.265 and y is about 0.8.

* * * * *